March 26, 1963 — E. E. MODES ETAL — 3,082,523
STRIPPING TOOL
Filed Sept. 26, 1961
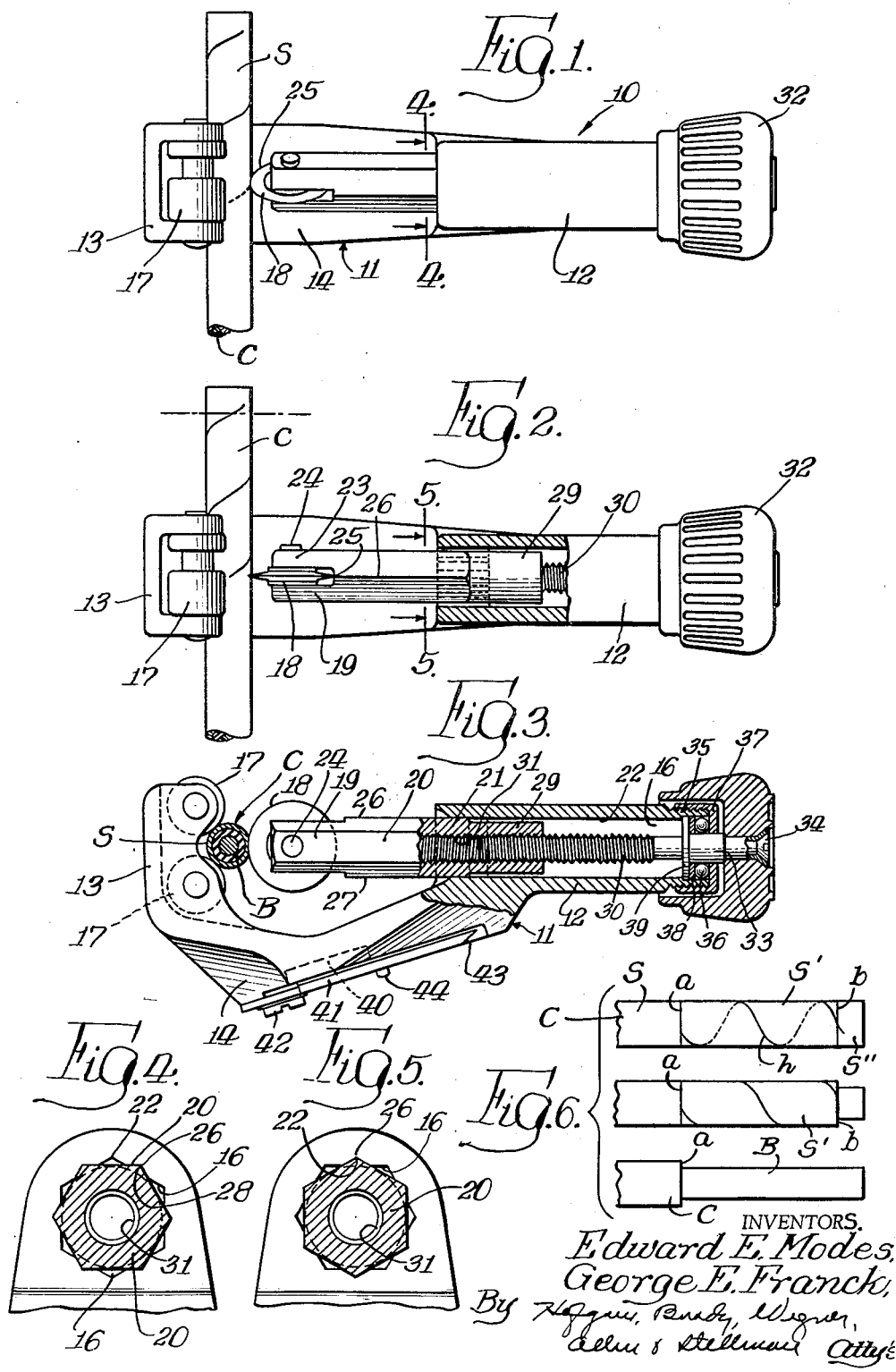
INVENTORS.
Edward E. Modes,
George E. Franck, 3,082,523
STRIPPING TOOL
Edward E. Modes, Deerfield, and George E. Franck, Morton Grove, Ill., assignors to Imperial-Eastman Corporation, a corporation of Illinois
Filed Sept. 26, 1961, Ser. No. 140,901
3 Claims. (Cl. 30—102)

This invention relates to cable working tools and in particular to a tool for use in stripping a sheath from an end of a cable.

One method of removing an end portion of the sheath of a sheathed cable, such as electrical conductor cable, is to cut through the sheath along an annular line spaced the desired distance back from the end of the cable. Such a cut is conventionally made with a hacksaw or the like. Substantial difficulty is experienced in limiting the cut to the necessary depth without cutting into the underlying cable portion. Even skilled persons, after many years of working with such cable, from time to time cause the cut to be excessively deep, thereby requiring that portion of the cable to be discarded and a second stripping operation to be effected. This is not only time-consuming but relatively costly and troublesome, particularly where the cable has an accurate-length requirement.

Another problem inherent in the conventional stripping operations, is the difficulty of removing the cut end portion of the sheath. In many instances, it is impossible to slide the cut sheath portion over the end of the cable to remove it therefrom without additionally cutting the sheath end portion longitudinally so as to spilt it. This operation is relatively difficult as the splitting cut being made parallel to the axial extent of the cable requires an accurate alignment with the axis so that the cutting tool does ont slip to either side of the cable during the splitting operation.

The present invention comprehends a new and improved stripping tool which eliminates the above problems in a novel and simple manner, and substantially facilitates the stripping of sheathed cable.

Thus, a principal object of the present invention is the provision of a new and improved cable stripping tool.

Another object of the invention is the provision of such a stripping tool providing improved accurate cutting of the cable sheath for separating the end portion of the sheath from the remainder thereof and splitting the end portion for removal from the end of the cable.

A further object is to provide such a stripping tool including a cutter wheel and means for selectively retaining the cutter wheel in any one of a plurality of positions angularly related to the axis of the cable to be stripped.

Still another object of the invention is to provide such a stripping tool including means providing facilitated positioning of the cutter wheel in any one of the angularly related positions.

Still another object of the invention is to provide such a stripping tool including new and improved means for effectively positively precluding the cutting of the portion of the cable underlying the sheath at the line of separation of the end portion of the sheath from the remainder thereof.

Other features and advantages of the invention will be apparent from the following description taken in connection with the accompanying drawing wherein:

FIG. 1 is a plan view of a stripping tool embodying the invention, illustrating the arrangement thereof in a first step of removal of the sheath end from a sheath cable;

FIG. 2 is a plan view, partially in section, similar to that of FIG. 1, but illustrating the arrangement of the tool as in a second step of removal of the sheath end from a sheath cable;

FIG. 3 is a side elevation thereof with a portion in diameter section illustrating the structure of the cutter wheel advancing means;

FIG. 4 is a transverse section taken substantially along the line 4—4 of FIG. 1;

FIG. 5 is a transverse section taken substantially along the line 5—5 of FIG. 2; and FIG. 6 is an elevational illustration of the three steps of sheath removal by means of the tool of the instant invention.

In the exemplary embodiment of the invention as disclosed in the drawing, a stripping tool generally designated 10 is shown to comprise a body 11 defining a support portion 12, a retaining portion 13, and a connecting portion 14 extending between the support and retaining portions. The support portion 12 is provided with an axial bore 16 opening toward the retaining portion 13 and the retaining portion is provided with a pair of parallel spaced rollers 17 against which the cable C is held during the sheath stripping operation to have its axis perpendicularly intersect the axis of bore 16.

The stripping of the sheath S from the cable C is effected by the cutting of the sheath by means of a cutter wheel 18 secured to the distal end 19 of a carrier member 20 having an inner end 21 axially movable in bore 16. As best seen in FIGS. 4 and 5, bore 16 has a regular polyhedral cross section and in the illustrated embodiment is dodecagonal. The carrier member 20 is provided with a regular polyhedral cross section, and in the illustrated embodiment is hexagonal. Thus, the carrier may have non-rotative, axially movable movement within bore 16 in any one of a plurality of twelve different positions angularly about the axis of bore 16, herein the different positions being spaced apart 30°. The uppermost apex 22 of the cross section of bore 16 preferably lies in a plane of the axis of bore 16 and perpendicular to the axis of the cable C retained by the rollers 17. The cutter wheel 18 is pivotally carried between the legs 23 of bifurcated end portion 19 of the carrier member by means of a pivot 24 whereby the plane of the annular cutting edge 25 of the cutter wheel is aligned with a pair of diametrically opposed apexes 26 and 27 of the hexagonal carrier member. Thus, when the apex 26 of the carrier member is aligned with the apex 22 of the bore 16, the plane of the cutting edge 25 is accurately perpendicular to the axis of the cable C, as shown in FIG. 2. This arrangement of the carrier member 20 within the bore 16 is illustrated in FIG. 5. When the apex 26 of the carrier member is aligned with an apex 28 of the bore 16 spaced 30° from apex 22, the plane of the cutting edge 25 of cutter wheel 18 is disposed at an angle of approximately 60° to the axis of the cable C as shown in FIG. 1, this arrangement of the carrier member 20 in bore 16 being illustrated in FIG. 4. Obviously, other dispositions of the plane of the cutting edge 25 at 30° intervals may be obtained by arranging the carrier member with the apex 26 aligned selectively with any one of the other apexes of the bore 16.

To effect the angular repositioning of the carrier member, the carrier member is moved outwardly from the bore 16 until the hexagonal portion 21 is disposed outwardly of the bore. The inner end 29 of the carrier member is arranged to have clearance with the bore 16; in the illustrated embodiment, the inner end 29 is cylindrical, having a diameter smaller than the minimum transverse dimension of the bore 16. To effect the inward and outward movement of the carrier member, a screw 30 is provided, extending axially through bore 16 and threadedly received in a threaded bore 31 opening axially inwardly in the carrier member 20. The threaded member 30 is rotated by a knob 32 secured to an inner end 33 of the threaded member by suitable means such as screw 34. The inner end 33 of the threaded member 30 is journalled in the inner end 35 of the body portion 12 by suitable means such as roller bearings 36 and is retained against axial movement by means of a cap 37 threaded to end portion 35, and a thrust washer 38 backing against a collar 39 on the threaded member portion 33.

Body portion 14 is provided with a downwardly opening recess 40 which is normally closed by a blade 41 pivotally connected to the body by suitable means such as pivot screw 42. The recess 40 is adapted to hold a spare cutter wheel 18 as desired. The distal end 43 of the blade comprises a sharp tip for use in separating the end of the cable sheath from the remainder thereof in the stripping operation as will be brought out more fully hereinafter. A tab 44 is provided on the blade for facilitating the movement thereof from the flush arrangement thereof with the body portion 14 as shown in FIG. 3, to an extended position (not shown) wherein the blade projects 180° from the position shown in FIG. 3 to dispose the tip portion 43 for use as a prying element.

The use of stripping tool 10 is extremely simple. The cutter wheel is firstly positioned as shown in FIG. 1 to extend at an angle of approximately 60° to the axis of the cable C. This positioning of the cutter wheel may be effected prior to the positioning of the cable C against the rollers 17 to provide sufficient clearance for the carrier member 20 outwardly of axis 16 to remove the hexagonal mid-portion 21 therefrom. The knob 32 is suitably rotated, after the cable C is disposed against the rollers 17 as shown in FIG. 1, to advance the cutter wheel into engagement with the sheath of the cable. The initial engagement of the cutting edge 25 with the cable sheath is preferably adjacent the annular line *a* defining the plane of separation of the end portion S' from the remainder of the cable sheath S. The cutter wheel is advanced sufficiently to cause the edge 25 to bite into the sheath a small amount. The tool 10 is then grasped by the body 11 and caused to move about the sheath portion S' in a helical path to define a helical cut *h* as shown in FIG. 6. The movement of the cutter wheel thusly is preferably terminated at approximately an annular line *b* spaced a small distance from the distal end of the cable so that the cutter wheel is not allowed to run off the end of the cable. The knob 32 is then rotated to advance the cutter wheel further into the sheath S and the tool is then manipulated in the reverse direction to cause the cutter wheel to move back through the cut *h* thereby deepening the helical cut. The back and forth helical reciprocation of the tool is then continued until the sheath portion S' is completely cut through along the cut *h*.

The cable C is then removed from the tool 10 and the carrier member 20 is repositioned to the position of FIG. 2. The cable is then reinstalled against rollers 17 with the cutter wheel 18 aligned with the line *b*. The cutter wheel is then advanced into the sheath and the tool 10 is rotated about the axis of the cable to separate the distal portion S" from the sheath portion S' as shown in the center illustration of FIG. 6. The cable is then repositioned to dispose the cutter wheel 18 in alignment with the line *a* and the cutter wheel is then advanced to penetrate into the sheath along line *a* to a depth of approximately one-third of the thickness of the sheath. The cable is then removed from the tool 10 and the blade 41 is repositioned to extend outwardly from the body with the tip 43 outermost. The tip 43 is then inserted between the sheath portion S' and the core B of the cable adjacent the line *b* to pry an end of the helically cut sheath portion S' away from the core. The helical cut portion is then twisted free of the core along the entire length thereof between lines *a* and *b* to strip it free therefrom. The freed helical cut portion S' is then gently bent along the line *a* to fracture the sheath along the partially cut line and thereby complete the separation of the sheath portion S' from the cable.

By means of tool 10, a stripping of the sheath end from the cable is effected positively precluding a cutting of the core B at line *a*, as at no time need the cutter wheel extend into the sheath along this line more than approximately one-third of the thickness of the sheath. Further, the splitting of the portion of the sheath to be removed is readily and positively effected by the above described helical cutting operation which effectively eliminates possible injury to the user as by the stripping tool slipping from the cable sheath as where the splitting of the sheath portion is effected by a cut parallel to the axis of the cable. The positioning of the cutter wheel in the different angular positions thereof is readily effected by the simple manipulations of the knob 32 as discussed above and facilitated rotation of the carrier member with the hexagonal portion thereof disposed outwardly of the bore 16. Thus, stripping tool 10 comprises a simple, economical structure providing an improved facilitated stripping of the cable sheath effectively eliminating the problems and disadvantages of the known tools for and methods of cable stripping.

While we have shown and described one embodiment of our invention, it is to be understood that it is capable of many modifications. Changes, therefore, in the construction and arrangement may be made without departing from the spirit and scope of the invention as defined in the appended claims.

We claim:

1. A tool for use in stripping a sheath from an end of a cable, comprising: a body having a support portion having a bore therethrough, said bore having a dodecagonal cross section, and a retaining portion spaced from said support coaxially of said bore; means on said retaining portion for holding the cable end to extend axially transversely to the axis of said bore; a cutter wheel having an annular cutting edge defining a cutting plane; means carrying said cutter wheel intermediate said support portion and said retaining portion with said cutting plane parallel to the axis of said bore, said carrying means including a carrier member having a polygonal cross section mating in said body bore to retain said cutter wheel selectively at different ones of a plurality of preselected angles about the axis of said bore; and means for forcibly advancing said cutter wheel toward said holding means for cutting selectively at said different preselected angles the sheath of a cable end held by said holding means.

2. A tool for use in stripping a sheath from an end of a cable, comprising: a body having a support portion having a bore therethrough, said bore having a polygonal cross section, and a retaining portion spaced from said support coaxially of said bore; means on said retaining portion for holding the cable end to extend axially transversely to the axis of said bore; a cutter wheel having an annular cutting edge defining a cutting plane; means carrying said cutter wheel intermediate said support portion and said retaining portion with said cutting plane parallel to the axis of said bore, said carrying means including a carrier member having a polygonal cross section mating in said polygonal bore to retain said cutter wheel selectively at different ones of a plurality of preselected angles about the axis of said bore, said body bore cross section being a polygon having twice the number of sides of the polygonal cross section of the carrier; and means for forcibly advancing said cutter wheel toward said holding means for cutting selectively at said different preselected angles the sheath of a cable end held by said holding means.

3. A tool for use in stripping a sheath from an end of a cable, comprising: a body having a support portion having a bore therethrough, said bore having a dodecagonal cross section, and a retaining portion spaced from said support coaxially of said bore; means on said retaining portion for holding the cable end to extend axially transversely to the axis of said bore; a cutter wheel having an annular cutting edge defining a cutting plane; means carrying said cutter wheel intermediate said support portion and said retaining portion with said cutting plane parallel to the axis of said bore, said carrying means including a carrier member having a hexagonal cross section mating in said body bore to retain said cutter wheel selectively at different ones of a plurality of preselected angles about the axis of said bore; and means for forcibly advancing said cutter wheel toward said holding means for cutting selectively at said different preselected angles the sheath of a cable end held by said holding means.

References Cited in the file of this patent
UNITED STATES PATENTS

| | | |
|---|---|---|
| 1,275,225 | Cleve | Aug. 13, 1918 |
| 2,629,926 | Franck | Mar. 3, 1953 |
| 3,013,335 | Kowal | Dec. 19, 1961 |